US012039948B2

(12) United States Patent
Chen et al.

(10) Patent No.: US 12,039,948 B2
(45) Date of Patent: Jul. 16, 2024

(54) DRIVING METHOD FOR LIQUID CRYSTAL DISPLAY PANEL AND NON-TRANSITORY COMPUTER-READABLE STORAGE MEDIUM

(71) Applicants: Wuhan BOE Optoelectronics Technology Co.,Ltd., Hubei (CN); BOE TECHNOLOGY GROUP CO., LTD., Beijing (CN)

(72) Inventors: Hangyu Chen, Beijing (CN); Lijun Xiao, Beijing (CN); Junmin Zhang, Beijing (CN); Bing Li, Beijing (CN); Feng Jiang, Beijing (CN); Meng Feng, Beijing (CN); Mengchao Shuai, Beijing (CN); Jianmin Xiang, Beijing (CN); Yun Bai, Beijing (CN)

(73) Assignees: Wuhan BOE Optoelectronics Technology Co., Ltd., Hubei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/764,635

(22) PCT Filed: Mar. 22, 2021

(86) PCT No.: PCT/CN2021/082023

§ 371 (c)(1),
(2) Date: Sep. 29, 2022

(87) PCT Pub. No.: WO2022/198367

PCT Pub. Date: Sep. 29, 2022

(65) Prior Publication Data

US 2024/0119912 A1 Apr. 11, 2024

(51) Int. Cl.
*G09G 3/36* (2006.01)

(52) U.S. Cl.
CPC ......... *G09G 3/3614* (2013.01); *G09G 3/3607* (2013.01); *G09G 2320/0257* (2013.01); *G09G 2360/145* (2013.01); *G09G 2360/16* (2013.01)

(58) Field of Classification Search
CPC ............... G09G 3/3607; G09G 3/3614; G09G 2320/0257; G09G 2360/145; G09G 2360/16
See application file for complete search history.

(56) References Cited

U.S. PATENT DOCUMENTS

| | | | |
|---|---|---|---|
| 2009/0310077 | A1 | 12/2009 | Kim |
| 2013/0235061 | A1 | 9/2013 | Sadasue |

(Continued)

FOREIGN PATENT DOCUMENTS

| | | | |
|---|---|---|---|
| CN | 101604512 | A | 12/2009 |
| CN | 102136243 | A | 7/2011 |

(Continued)

*Primary Examiner* — Gene W Lee
(74) *Attorney, Agent, or Firm* — HOUTTEMAN LAW LLC

(57) ABSTRACT

The present disclosure provides a driving method for a liquid crystal display panel and a non-transitory computer storage medium. The driving method includes: for the plurality of sub-pixels, adopting a first gray-level table for displaying a picture in other frame pictures other than a first frame picture in each of the plurality of predetermined periods, the first gray-level table including a plurality of first gray-level values; and adopting a second gray-level table for displaying a picture in the first frame picture in each of the plurality of predetermined periods, the second gray-level table including a plurality of second gray-level values.

20 Claims, 3 Drawing Sheets

(56) References Cited

U.S. PATENT DOCUMENTS

| | | | |
|---|---|---|---|
| 2014/0055435 A1 | 2/2014 | Chen et al. | |
| 2018/0047351 A1 | 2/2018 | Yan | |
| 2021/0193064 A1 | 6/2021 | Piao et al. | |
| 2022/0415280 A1* | 12/2022 | Liang | G09G 3/3696 |

FOREIGN PATENT DOCUMENTS

| | | | |
|---|---|---|---|
| CN | 105654917 | A | 6/2016 |
| CN | 106997754 | A | 8/2017 |
| CN | 109712587 | A | 5/2019 |
| JP | 2013186427 | A | 9/2013 |

* cited by examiner

DRIVING METHOD FOR LIQUID CRYSTAL DISPLAY PANEL AND NON-TRANSITORY COMPUTER-READABLE STORAGE MEDIUM

TECHNICAL FIELD

The present disclosure relates to the field of display technology, and in particular, to a driving method for a liquid crystal display panel and a non-transitory computer-readable storage medium.

BACKGROUND

Currently, a liquid crystal display (LCD) apparatus is widely used all over the world. The liquid crystal display apparatus includes a liquid crystal display panel including a plurality of sub-pixels arranged in an array. A driving voltage for each of the plurality of sub-pixels is adjusted to control the rotation of liquid crystal molecules. In order to prevent polarization of the liquid crystal molecules, an alternating current driving mode is generally adopted, that is, the driving voltage for each of the plurality of sub-pixels is repeatedly switched between a positive polarity and a negative polarity. In certain control modes, a phenomenon that the driving voltage for a sub-pixel has a same polarity in a previous frame picture as that in a subsequent frame picture occurs.

SUMMARY

One aspect of the present disclosure provides a driving method for a liquid crystal display panel, the liquid crystal display panel includes a plurality of sub-pixels arranged in an array, and a display time for the liquid crystal display panel is divided into a plurality of predetermined periods with an equal time length to display a plurality of odd-numbered frame pictures and a plurality of even-numbered frame pictures; in each of the plurality of predetermined periods, the plurality of odd-numbered frame pictures and the plurality of even-numbered frame pictures are sequentially switched, and driving voltages for each of the plurality of sub-pixels is switched between a positive polarity and a negative polarity when the plurality of odd-numbered frame pictures and the plurality of even-numbered frame pictures are sequentially switched; and a polarity of a driving voltage for each of the plurality of sub-pixels in a last frame picture in one of the plurality of predetermined periods is the same as a polarity in a first frame picture in a subsequent predetermined period after the one of the plurality of predetermined periods, the driving method further includes: for the plurality of sub-pixels, adopting a first gray-level table for displaying other frame pictures other than a first frame picture in each of the plurality of predetermined periods, the first gray-level table including a plurality of first gray-level values; and adopting a second gray-level table for displaying the first frame picture in each of the plurality of predetermined periods, the second gray-level table including a plurality of second gray-level values, such that a difference of each of the plurality of sub-pixels, between brightness of the sub-pixel obtained by a second gray-level value in the second gray-level table when the first frame picture is displayed and brightness of the sub-pixel obtained by a corresponding first gray-level value in the first gray-level table when the other frame pictures are displayed, is minimum under a same charging duration, the second gray-level value being smaller than the corresponding first gray-level value.

In some embodiments, a duration of each of the odd-numbered frame picture and the even-numbered frame picture includes a gray-level voltage input stage and a picture holding stage, and the driving method further includes switching the first gray-level table to the second gray-level table in the picture holding stage of the last frame picture in the predetermined period.

In some embodiments, the driving method further includes switching the second gray-level table to the first gray-level table in the picture holding stage of the first frame picture in the predetermined period.

In some embodiments, the switching the first gray-level table to the second gray-level table and the switching the second gray-level table to the first gray-level table include: determining whether it is in a picture holding stage of the first frame picture; and if so, switching the second gray-level table to the first gray-level table; and determining whether it is in a picture holding stage of the last frame picture; and if so, switching the first gray-level table to the second gray-level table.

In some embodiments, the determining whether it is in the picture holding stage of the first frame picture or in the picture holding stage of the last frame picture includes counting clock signals by a timer, thereby switching the first gray-level table to the second gray-level table or switching the second gray-level table to the first gray-level table.

In some embodiments, the switching the first gray-level table to the second gray-level table or the switching the second gray-level table to the first gray-level table includes: step S200, counting the clock signals; step S202, determining whether a counting value of the clock signals reaches a first predetermined value; and if so, determining that it is in the picture holding stage of the last frame picture and proceeding to step S204; and if not, returning to step S200; step S204, switching the first gray-level table to the second gray-level table, and resetting the counting; step S206, counting the clock signals; step S208, determining whether the counting value of the clock signals reaches a second predetermined value; and if so, determining that it is in the picture holding stage of the first frame picture and proceeding to step S210; and if not, returning to step S206; and step S210, switching the second gray-level table to the first gray-level table, and returning to step S200 to continue counting the clock signals.

In some embodiments, the driving method further includes obtaining the plurality of second gray-level values in the second gray-level table based on the plurality of first gray-level values in the first gray-level table, wherein the obtaining the plurality of second gray-level values in the second gray-level table includes: determining a gray-level value range including the plurality of first gray-level values in the first gray-level table; obtaining a plurality of first representative gray-level values from the gray-level value range including the plurality of first gray-level values in the first gray-level table, wherein the plurality of first representative gray-level values are ranked in an order from a minimum to a maximum in the first gray-level table and cover the gray-level value range including the plurality of first gray-level values; determining brightness of each of the first representative gray-level values in the other frame pictures other than the first frame picture by brightness waveform test; determining brightness of each of the first representative gray-level values in the first frame picture by the brightness waveform test; and progressively decreasing a gray-level value of each of the plurality of first representative gray-level values such that a difference between the brightness in the first frame picture obtained from each decreased first representative gray-level value and the brightness in the last frame picture obtained from the corresponding first representative gray-level value which is not decreased is minimum, wherein each decreased first representative gray-level value is taken as a corresponding second representative gray-level value.

In some embodiments, the driving method further includes performing an interpolation processing on two second representative gray-level values adjacent to each other in value and two corresponding first representative gray-level values, and first gray-level values in the first gray-level table between the two corresponding representative first gray-level values and other than the plurality of first representative gray-level values, to obtain the second gray-level values corresponding to the first gray-level values between the two corresponding first representative gray-level values and other than the plurality of first representative gray-level values, and storing the second representative gray-level values and the second gray-level values in the second gray-level table.

In some embodiments, the performing an interpolation processing including performing a linear interpolation to obtain the second gray-level values corresponding to the first gray-level values between the two adjacent first representative gray-level values and other than the plurality of first representative gray-level values.

In some embodiments, the progressively decreasing a gray-level value of each of the plurality of first representative gray-level values such that a difference between the brightness in the first frame picture obtained from each decreased first representative gray-level value and the brightness in the last frame picture obtained from the corresponding first representative gray-level value which is not decreased is minimum includes: inputting the gray-level voltages of the first representative gray-level values to the plurality of sub-pixels in the last frame picture of a predetermined period of the plurality of predetermined periods, and inputting the gray-level voltages of the first representative gray-level values to the plurality of sub-pixels in the first frame picture in a subsequent predetermined period after the predetermined period; and progressively decreasing the first representative gray-level values input to the plurality of sub-pixels in the first frame picture in the subsequent predetermined period, until a difference between a peak of a brightness waveform of the last frame picture in the predetermined period and a peak of a brightness waveform of the first frame picture in the subsequent predetermined period after the predetermined period is minimum.

In some embodiments, the brightness waveform test is performed by a photo sensor.

In some embodiments, the driving method further includes adopting an interlace scanning mode to drive the liquid crystal display panel when displaying alternately odd-numbered frame pictures and even-numbered frame pictures, which includes: inputting the gray-level voltages corresponding to the gray-level values to the odd-numbered rows of sub-pixels in one of the odd-numbered frame picture and the even-numbered frame picture adjacent to each other, and obtaining the gray-level values of a corresponding even-numbered row of sub-pixels of the even-numbered rows of sub-pixels based on the gray-level values of two adjacent odd-row numbered rows of sub-pixels in a same column, and inputting the gray-level voltages corresponding to the obtained gray-level values of the even-numbered rows of sub-pixels to the corresponding even-numbered row of sub-pixels; and inputting the gray-level voltages corresponding to the gray-level values to the even-numbered rows of sub-pixels in the other of the odd-numbered frame picture and the even-numbered frame picture adjacent to each other, and obtaining the gray-level values of a corresponding odd-numbered row of sub-pixels the odd-numbered rows of sub-pixels based on the gray-level values of two adjacent even-numbered rows of sub-pixels in a same column, and inputting the gray-level voltages corresponding to the obtained gray-level values of the odd-numbered rows of sub-pixels to the corresponding odd-numbered row of sub-pixels.

In some embodiments, the gray-level values of the corresponding even-numbered row of sub-pixels each are obtained by calculating an average value of the gray-level values of the two adjacent odd numbered rows of sub-pixels in a same column, and the gray-level values of the corresponding odd-numbered rows of sub-pixels each are obtained by calculating an average value of the gray-level values of the two adjacent even-numbered rows of sub-pixels in a same column.

In some embodiments, the predetermined period is 28 seconds.

Another aspect of the present disclosure provides a non-transitory computer-readable storage medium storing instructions which, when executed by a processor, cause the processor to perform the above driving method.

DETAIL DESCRIPTION OF EMBODIMENTS

Figure 1:
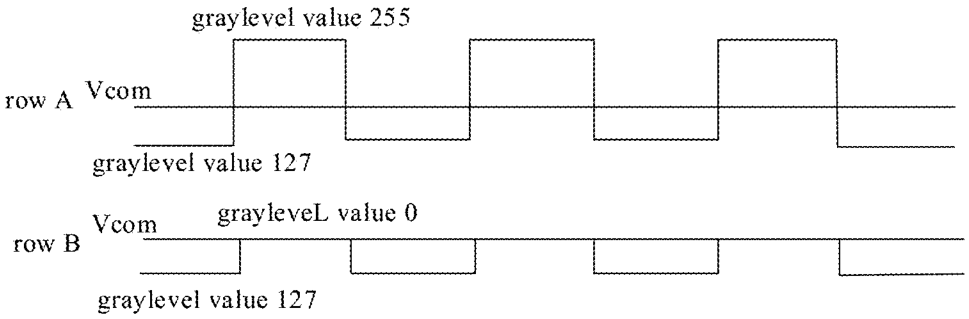
FIG. 1 is a schematic diagram illustrating voltages of two adjacent rows of sub-pixels in a liquid crystal display panel where line residual image occurs in the related art.

In order to enable one of ordinary skill in the art to better understand the technical solutions of the present disclosure, the present disclosure is further described in detail below in combination with the drawings and specific embodiments.

Currently, a liquid crystal display device is widely used all over the world. In some remote areas, an interlace scanning mode may be adopted for displaying due to a poor communication quality. In such interlace scanning mode, residual image may occur in an area of a liquid crystal display panel where a gray-level value changes. To eliminate the residual image, a 28SPOL (28 seconds (s) polarity) inversion may be adopted. However, the 28SPOL inversion may cause flicker.

The principle of the interlace scanning mode and of the 28SPOL inversion, and the caused problems will be described below, respectively.

An interlace scanning mode is a scanning mode for performing special processing by a system on a chip (SOC). In the interlace scanning mode and through the special processing by the SOC, a liquid crystal display panel may be caused to receive only the gray-level values required for odd-numbered rows of sub-pixels in odd-numbered frames, and gray-level values required for even-numbered rows of sub-pixels may be derived/obtained by the SOC based on the gray-level values of the odd-numbered rows of sub-pixels and through interpolation processing. Accordingly, only the gray-level values required for the even-numbered rows of sub-pixels is received in the even-numbered frames, and the gray-level values required for the odd-numbered rows of sub-pixels may be derived by the SOC based on the gray-level values of the even-numbered rows of sub-pixels and through the interpolation processing. That is, only half the gray-level values for typically displaying one frame picture are required by the special processing of the SOC. That is, when odd-numbered frame pictures and even-numbered frame pictures are displayed alternately, the gray-level voltages corresponding to the gray-level values are input to the odd-numbered rows of sub-pixels in one of the odd-numbered frame picture and the even-numbered frame picture adjacent to each other, and the gray-level values of the even-numbered rows of sub-pixels are derived based on the gray-level values of two adjacent odd-numbered rows of sub-pixels in a same column and the gray-level voltages corresponding to the derived gray-level values of the even-numbered rows of sub-pixels are input to the corresponding even-numbered rows of sub-pixels; and the gray-level voltages corresponding to the gray-level values are input to the even-numbered rows of sub-pixels in the other of the odd-numbered frame picture and the even-numbered frame picture adjacent to each other, and the gray-level values of the odd-numbered rows of sub-pixels are derived based on the gray-level values of two adjacent even-numbered rows of sub-pixels in a same column and the gray-level voltages corresponding to the derived gray-level values of the odd-numbered rows of sub-pixels are input to the corresponding odd-numbered rows of sub-pixels. Moreover, the gray-level values of the corresponding even-numbered rows of sub-pixels may be derived by calculating an average value of the gray-level values of the two adjacent odd-numbered rows of sub-pixels in the same column, and the gray-level values of the corresponding odd-numbered rows of sub-pixels may be derived by calculating an average value of the gray-level values of the two adjacent even-numbered rows of sub-pixels in the same column.

As shown in table 1 below, values in italics indicate the gray-level values derived by interpolation processing, and values in non-italics indicate actually received gray-level values.

TABLE 1

| | odd-numbered frame 1 | even-numbered frame1 | odd-numbered frame 2 | even-numbered frame2 |
|---|---|---|---|---|
| | +255 | *−255* | +255 | *−255* |
| | *−255* | +255 | *−255* | +255 |
| | +255 | *−255* | +255 | *−255* |
| row A→ | *−127* | +255 | *−127* | +255 |
| row B→ | +0 | *−127* | +0 | *−127* |
| | *−0* | +0 | *−0* | +0 |
| | +0 | *−0* | +0 | *−0* |

As can be seen from table 1, for example, for the gray-level values shown in the odd-numbered frame 1, the gray-level value of the row A (such as even-numbered row) of sub-pixels may be derived from the gray-level values of two adjacent rows (odd-numbered rows) of sub-pixels which are above and below the row A of sub-pixels respectively. For example, an average value of the gray-level values of the two adjacent rows of sub-pixels, which are above and below the row A of sub-pixels respectively, may be calculated and then inverted in sign as the gray-level value of the row A of sub-pixels. Meanwhile, as can also be seen from table 1, through the above special processing by the SOC, asymmetric gray-level voltages are charged (input) into the row A of sub-pixels and the row B of sub-pixels when a switch between an odd-numbered frame and an even-numbered frame occurs. Referring to table 1 and FIG. 1, the row A of sub-pixels has a gray-level value of −127 in the odd-numbered frame 1, a gray-level value of +255 in the even-numbered frame 1, a gray-level value of −127 in the odd-numbered frame 2, and a gray-level value of +255 in the even-numbered frame 2; and the row B of sub-pixels has a gray-level value of +0 in the odd-numbered frame 1, a gray-level value of −127 in the even-numbered frame 1, a gray-level value of +0 in the odd-numbered frame 2, and a gray-level value of −127 in the even-numbered frame 2, so that the gray-level voltages charged into the row A of sub-pixels and the row B of sub-pixels are asymmetric when the even-numbered frame 1 is switched to the odd-numbered frame 2, resulting in a direct current bias voltage and a line residual image in the row of sub-pixels at an interface of gray-level change.

The 28SPOL inversion means that an electrode polarity (POL) signal is inverted once every 28 s (seconds). That is, the polarity of the electrode polarity signal is changed once every 28 s, so that a direct current bias voltage of a sub-pixel at the interface of gray-level change is inverted once in polarity. In other words, after the polarity of the POL signal is inverted, the polarity of the driving voltage for the sub-pixel is changed with time from, e.g., +−+− to −+−+. As shown in table 2 below, the inversion time point of 28 s is reached after the even-numbered frame 1 has been displayed. In a case of non-28SPOL inversion, the polarity of the driving voltage for each of the respective sub-pixels in the even-numbered frame 1 and in the odd-numbered frame 2 before and after the inversion time point is shown in table 1.

TABLE 2

| | odd-numbered frame 1 | even-numbered frame1 | next frame after 28 s ↓ | odd-numbered frame 2 | even-numbered frame2 |
|---|---|---|---|---|---|
| | +255 | *−255* | | −255 | *+255* |
| | *−255* | +255 | | *+255* | −255 |
| | +255 | *−255* | | −255 | *+255* |
| row A→ | *−127* | +255 | | *+127* | −255 |
| row B→ | +0 | *−127* | | −0 | *+127* |
| | *−0* | +0 | | *+0* | −0 |
| | +0 | *−0* | | −0 | *+0* |

In a case of 28SPOL inversion, after the inversion time point, the polarity of the driving voltage of each sub-pixel in the odd-numbered frame 2 is the same as the polarity of the driving voltage of the corresponding sub-pixel in the even-numbered frame 1. For example, the driving voltage of the row A of sub-pixels has a positive polarity (+) in the even-numbered frame 1, and also the positive polarity (+) in the odd-numbered frame 2; and the driving voltage of the row B of sub-pixels has a negative polarity (−) in the even-numbered frame 1, and also the negative polarity (−) in the odd-numbered frame 2.

Figure 2:
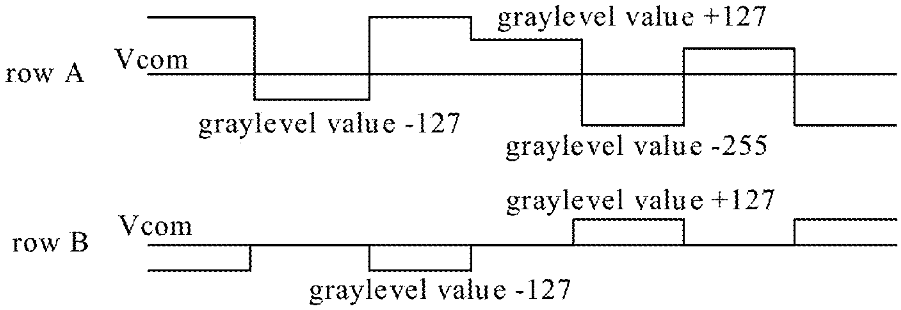
FIG. 2 is a schematic diagram illustrating voltages of two adjacent rows of sub-pixels in a liquid crystal display panel where line residual image is eliminated in the related art.

As shown in table 2, the gray-level values of the two adjacent rows of sub-pixels which are above and below the row A of sub-pixels respectively change. For example, the gray-level value in the odd-numbered frame 1 changes from a gray-level value of +255 to a gray-level value of +0, and the gray-level value in the odd-numbered frame 2 changes from a gray-level value of −255 to a gray-level value of −0, i.e., sub-pixels of the row A of sub-pixels are located at the interface of gray-level change. As shown in FIG. 2, for sub-pixels of the A row of sub-pixels at the interface of gray-level change, the gray-level voltage of the gray-level value of −127, which originally should be input, is changed into the gray-level voltage of the gray-level value of +127 in the odd-numbered frame 2, so that the direct current bias voltage for the liquid crystal molecules is inverted to offset the direct current bias voltage caused in a previous 28 s, and the line residual image generated in the row A of sub-pixels at the interface of gray-level change is eliminated. Similarly, for sub-pixels of the B row of sub-pixels at the interface of gray-level change, the gray-level voltage of the gray-level value of −127, which originally should be input, is changed into the gray-level voltage of the gray-level value of +127 in the odd-numbered frame 2, so that the direct current bias voltage for the liquid crystal molecules is inverted to offset the direct current bias voltage caused in the previous 28 s.

Figure 3:
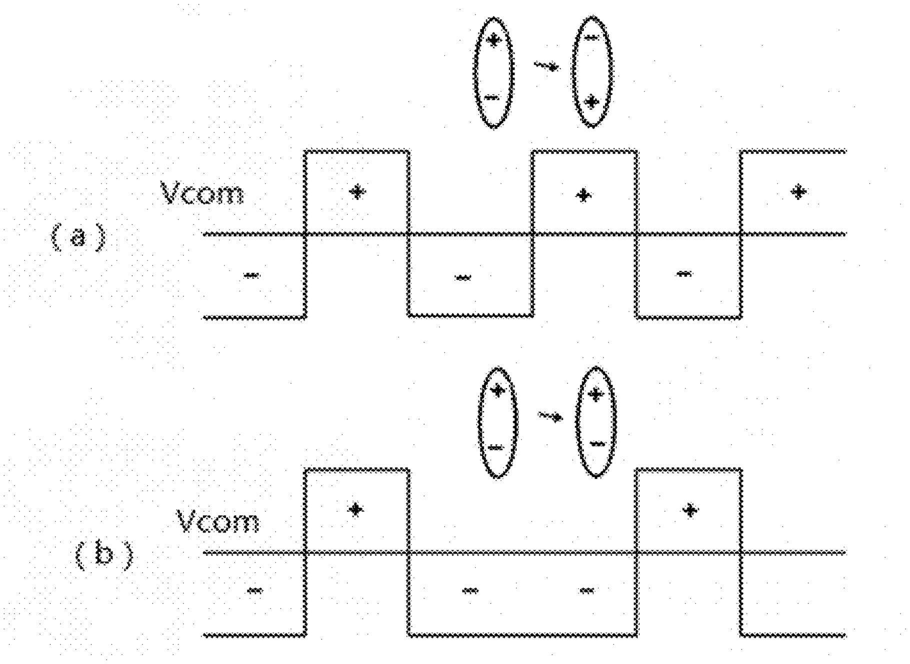
FIG. 3 is a schematic diagram illustrating voltages of two adjacent rows of sub-pixels in a liquid crystal display panel where flicker occurs in the related art.

However, the 28SPOL inversion causes the driving voltages for the respective sub-pixels in the two frames before and after the 28SPOL inversion to have a same polarity, which causes the liquid crystal molecules in the first frame after the 28SPOL inversion to have a better charging rate than the other frames, resulting in flicker visible to a naked eye. As shown in (a) of FIG. 3, in a case of non-28SPOL inversion, the polarity of the driving voltage for the liquid crystal molecules is inverted at the same time when the switch between the odd-numbered frame and the even-numbered frame occurs. As shown in (b) of FIG. 3, after the 28SPOL inversion, the polarity of the driving voltage of the liquid crystal molecules remains unchanged before and after the switch between the odd-numbered frame and the even-numbered frame. That is, when the POL signal is not inverted, the liquid crystal molecules rotate alternately in two directions; and in the first frame after the POL signal is inverted, the liquid crystal molecules are in a same direction as in the previous frame, so that the charging rate of the first frame is better, resulting in flicker of the display picture.

To eliminate the flicker of the display picture, the present disclosure provides a driving method for a liquid crystal display panel. The liquid crystal display panel includes a plurality of sub-pixels arranged in an array, and the display time of the liquid crystal display panel is divided into a plurality of predetermined periods with an equal time length, such as 28 s, for display. In each of the plurality of predetermined periods, a plurality of odd-numbered frame pictures and a plurality of even-numbered frame pictures are alternately displayed sequentially. Specifically, in each of the plurality of predetermined periods, the plurality of odd-numbered frame pictures and the plurality of even-numbered frame pictures are included, and are sequentially switched from a previous odd-numbered frame picture to a subsequent even-numbered frame picture and from a previous even-numbered frame picture to a subsequent odd-numbered frame picture. When the odd-numbered frame pictures and the even-numbered frame pictures are sequentially switched, the polarity of the driving voltage for each of the plurality of sub-pixels is switched between a positive polarity and a negative polarity. Moreover, the polarity of the driving voltage for each of plurality of sub-pixels in a last frame picture of a previous predetermined period is the same as the polarity of the driving voltage for the sub-pixel in a first frame picture of a subsequent predetermined period (immediately following the previous predetermined period). The driving method includes: for each of the plurality of sub-pixels, when displaying frame pictures other than the first frame picture in each of the plurality of predetermined periods, applying the sub-pixel with a first gray-level value in a first gray-level table corresponding to the brightness of the sub-pixel to be presented; and when displaying the first frame picture in each of the plurality of predetermined periods, applying the sub-pixel with a second gray-level value in a second gray-level table corresponding to the brightness of the sub-pixel to be presented, so that a difference, between the brightness of the sub-pixel obtained by the second gray-level value when the first frame picture is displayed and the brightness of the sub-pixel obtained by the first gray-level value when the frame pictures other than the first frame picture are displayed, is minimum under a same charging duration. The first gray-level table includes a plurality of first gray-level values, and the plurality of first gray-level values correspond to a plurality of brightness values of each of the plurality of sub-pixels to be presented, respectively; and the second gray-level table includes a plurality of second gray-level values corresponding to a plurality of brightness values of each of the plurality of sub-pixels to be presented, respectively. Moreover, when presenting a same brightness (or the brightness difference is minimal), the second gray-level value is smaller than the corresponding first gray-level value. The driving method is suitable for the above 28SPOL inversion.

Figure 4:
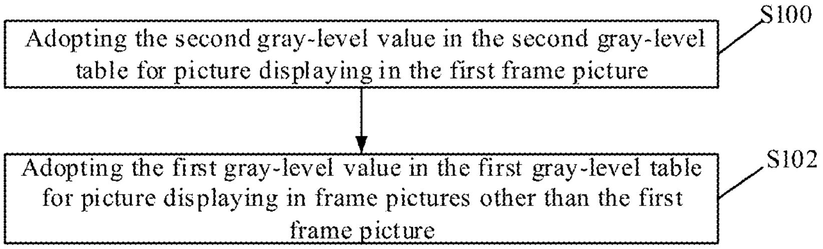
FIG. 4 is a flowchart of a method for driving a liquid crystal display panel according to an embodiment of the present disclosure.

FIG. 4 is a flowchart of a driving method for a liquid crystal display panel according to an embodiment of the present disclosure, and the driving method for a liquid crystal display panel of the present disclosure is described in detail below with reference to FIG. 4.

In step S100, the second gray-level value in the second gray-level table is adopted for displaying the first frame picture. The first frame picture herein refers to a first frame picture in each of the plurality of predetermined periods.

In step S102, the first gray-level value in the first gray-level table is adopted for displaying frame pictures other than the first frame picture. The other frame pictures herein refer to other frame pictures other than the first frame picture in each of the plurality of predetermined periods.

In a case of 28SPOL inversion, the polarity of the driving voltage for each of the sub-pixels in the first frame picture in the current predetermined period is the same as the polarity of the driving voltage for the sub-pixel in the last frame picture in the previous predetermined period, so that for a same gray-level value, the brightness of the charged sub-pixel in the first frame picture is greater than the brightness of the charged sub-pixel in the other frame pictures, resulting in flicker. For example, if a gray-level value of L127 is adopted for displaying the first frame picture, the brightness of the first frame picture is greater than the brightness of the other frame pictures adopting the gray-level value of L127, resulting in flicker. The flicker of the first frame picture due to 28SPOL inversion can be reduced or even eliminated by adopting the above driving method of the present disclosure. For example, when the first frame picture is displayed, a smaller gray-level value, such as the gray-level value of L123, is adopted, and when the other frame pictures are displayed, a larger gray-level value of L127 is adopted, thereby presenting a same brightness. By adopting the above driving method of the present disclosure, when the first frame picture is displayed, the second gray-level value, which corresponds to and is smaller than the first gray-level value in the first gray-level table, is adopted for displaying, which may present the same brightness as that when the first gray-level value is adopted for displaying other frame pictures. A gray-level voltage refers to, for example, a voltage corresponding to a respective gray-level value in a range of 0 to 255, that is, one gray-level value corresponds to one driving voltage (i.e., a gray-level voltage).

In the present disclosure, a duration of each of the odd-numbered frame picture and the even-numbered frame picture may include a gray-level voltage input stage and a picture holding stage, and the first gray-level table is switched to the second gray-level table in the picture holding stage of the last frame picture in a predetermined period. In the gray-level voltage input stage of the last frame picture, gray-level voltages are input to respective sub-pixels in the liquid crystal display panel. After the gray-level voltages are input to the respective sub-pixels, a picture holding stage is entered. In the picture holding stage, the gray-level voltages are no longer input to the respective sub-pixels. At this time, the first gray-level table referred to when the gray-level voltages are input is switched to the second gray-level table under the control of a processor such as a software application, so that the gray-level voltage input for the subsequent frame picture is controlled based on the second gray-level table.

When a subsequent frame (first frame) picture after the last frame picture is displayed, during the gray-level voltage input stage of the first frame picture, since the first gray-level table has been switched to the second gray-level table, the gray-level voltages are input based on the second gray-level table. Since the first gray-level table is adopted for input of gray-level voltages in other frame pictures other than the first frame picture, the second gray-level table is switched to the first gray-level table in the picture holding stage of the first frame picture.

In the 28SPOL inversion, since the flicker occurs in the first frame picture when the gray-level voltages are input based on the first gray-level table adopted in a previous (last) frame picture, in the present disclosure, the first gray-level table as a reference is adjusted to obtain the second gray-level table, and a driving circuit of the liquid crystal display panel outputs a gray-level voltage based on the first gray-level table as a reference. The first gray-level table stores gray-level values and gray-level voltages in one to one correspondence with the gray-level values. When the gray-level voltages are input to the respective sub-pixels, the polarity of the gray-level voltages input to the respective sub-pixels is controlled based on whether the frame picture being displayed is an odd-numbered frame or an even-numbered frame. When the first frame picture is displayed, a logic board Tcon receives a front end signal of "outputting a gray-level value of 127". A second gray-level value of 123 in the second gray-level table is called based on the corresponding relationship between the first gray-level value of 127 in the first gray-level table and the second gray-level value of 123 in the second gray-level table, so as to display with the brightness corresponding to the front end signal of "outputting the gray-level value of 127". It is assumed herein that the display brightness of the first gray-level value of 127 in the first gray-level table in the other frame pictures is the same as the display brightness of the second gray-level value of 123 in the second gray-level table in the first frame picture. Therefore, the second gray-level value of 123 in the second gray-level table corresponds to the first gray-level value of 127 in the first gray-level table related to the front end signal of "outputting the gray-level value of 127".

Optionally, the switching from the first gray-level table to the second gray-level table and from the second gray-level table to the first gray-level table, includes: determining whether it is in the picture holding stage of the first frame picture, and if so, switching the second gray-level table to the first gray-level table; and determining whether it is in the picture holding stage of the last frame picture, and if so, switching the first gray-level table to the second gray-level table. That is, when it is determined that it is in the frame holding stage of the first frame picture, the second gray-level table is switched to the first gray-level table; and otherwise, the second gray-level table is still used in the subsequent frame picture. When it is determined that it is in the frame holding stage of the last frame picture, the first gray-level table is switched to the second gray-level table; and otherwise, the first gray-level table is still used in the subsequent frame picture. The first gray-level table is still used in other frame pictures between the first frame picture and the last frame picture in the same predetermined period.

Optionally, timing for counting a (active) clock signal is performed by a timer to determine whether it is in the picture holding stage of the first frame picture or in the picture holding stage of the last frame picture, thereby switching the first gray-level table to the second gray-level table or the second gray-level table to the first gray-level table based on a determination result. The following description will take an example in which a frame picture for the liquid crystal display panel includes 2160 rows of sub-pixels and 10 clock signals. The 10 clock signals may be divided into 5 groups, each of which includes two clock signals for one row of sub-pixels. One of the two clock signals in one group is an active (e.g., high level clock CLK) signal and the other is an inactive (e.g., low level) clock signal. The 5 groups of clock signals respectively are used to control five adjacent rows of sub-pixels. The 10 clock signals are taken as a unit, and the first active high level clock signal in the unit is counted. When the 10 clock signals are used to control a first 5 rows of sub-pixels, the first active high clock signal is counted as 1. When the 10 clock signals are used to control next 5 rows of sub-pixels, the first active high level clock signal is counted as 2, and so on. The number of the first active high level CLK signals in each frame picture is 2160/5+2 (2 dummy CLK signals, e.g., one reset CLK signal and one starting CLK signal), i.e., 434 first active high level CLK signals. In a case of 60 HZ refresh frequency and a predetermined period of 28 s, there may be 434×60×28=729120 first active high level CLK signals.

In one frame picture, the count of 434 indicates that the transmission of active data (gray-level voltage) for the frame picture is completed, and the picture holding (blank) stage is entered. In the blank stage of the first frame picture and of the last frame picture, the first gray-level table may be switched to the second gray-level table; or the second gray-level table may be switched to the first gray-level table, and the second gray-level table or the first gray-level table may be called by the data of the subsequent frame picture to output a corresponding gray-level voltage.

Figure 5:
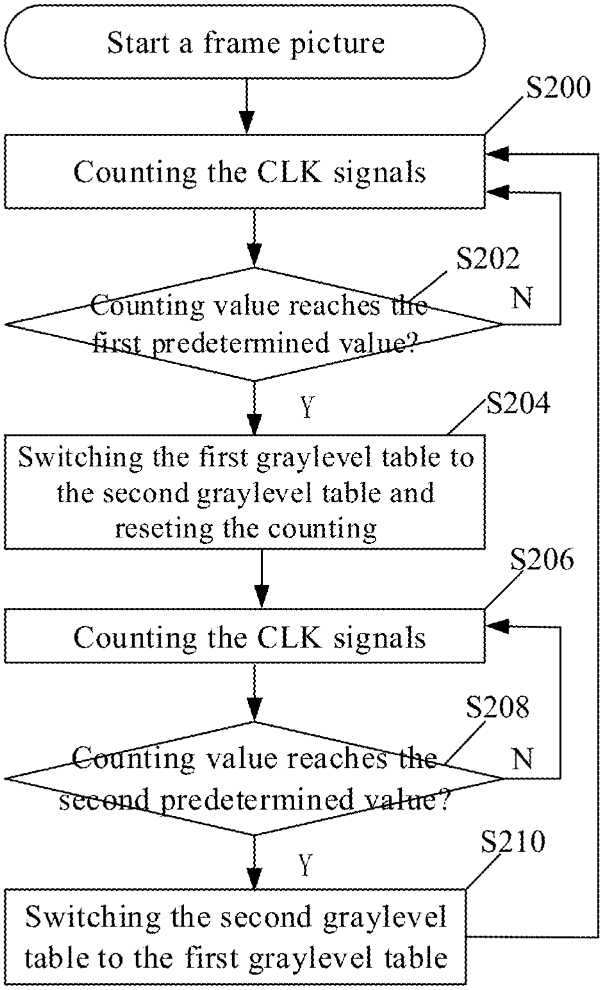
FIG. 5 is a timing control flowchart according to an embodiment of the present disclosure.

For example, in order to use the first gray-level table in the subsequent frame picture after the first frame picture, it is necessary to reset the count (i.e., counting from 0), to determine whether it is in the blank stage of the first frame picture after one 28 s, and to switch back to the first gray-level table. A timing control flowchart according to an embodiment of the disclosure is shown in FIG. 5. Referring to FIG. 5, the switching between the first gray-level table and the second gray-level table is described in detail below.

The timing control may start with displaying a frame picture. In step S200, the CLK signals are counted after the frame picture starts to be displayed.

In step S202, the counting value of the CLK signals is determined, i.e., whether the counting value of the (active) first clock signals reaches a first predetermined value is determined. If the counting value does not reach the first predetermined value (for example, 729120 first high level clock signals in the 28SPOL inversion), it returns to step S200 to continue counting. If the count value reaches the first predetermined value, it goes to step S204.

In step S204, the first gray-level table is switched to the second gray-level table, and the counting is reset. When the subsequent frame picture is displayed, the second gray-level table is adopted. Resetting the counting refers to reset the previous counting value to 0, and a next 28 s counting starts.

In step S206, the counting is started after resetting, and the CLK signals are counted.

In step S208, the counting value of the CLK signals is determined, i.e., whether the counting value of the (active) first clock signals reaches a second predetermined value is determined. If the counting value does not reach the second predetermined value (for example, 434 first high level clock signals in the 28SPOL inversion), it returns to step S206 to continue counting. If the counting value reaches the second predetermined value, it proceeds to step S210.

In step S210, the second gray-level table is switched to the first gray-level table, and it returns to step S200 to continue counting the CLK signals. After the second gray-level table is switched to the first gray-level table, the first gray-level table is adopted when a subsequent frame picture is displayed.

The present disclosure is described by taking an example in which one frame picture includes 2160 rows of sub-pixels and 10 clock signals, the 10 clock signals are divided into 5 groups and one high level signal of the 5 groups is counted. However, the present disclosure is not limited thereto.

The second gray-level table may be obtained based on the first gray-level table. How to obtain the second gray-level table based on the first gray-level table will be described below. For example, the logic board Tcon receives a front end signal of "outputting a gray-level value of 127", and then, looks up in the first gray-level table including gray-level values of three colors of R (red), G (green), and B (blue). Then, the gray-level values of the three colors in the first gray-level table are reduced to obtain a second gray-level table. Then, the output gray-level voltage may be changed based on the second gray-level table with reduced gray-level values.

Figure 6:
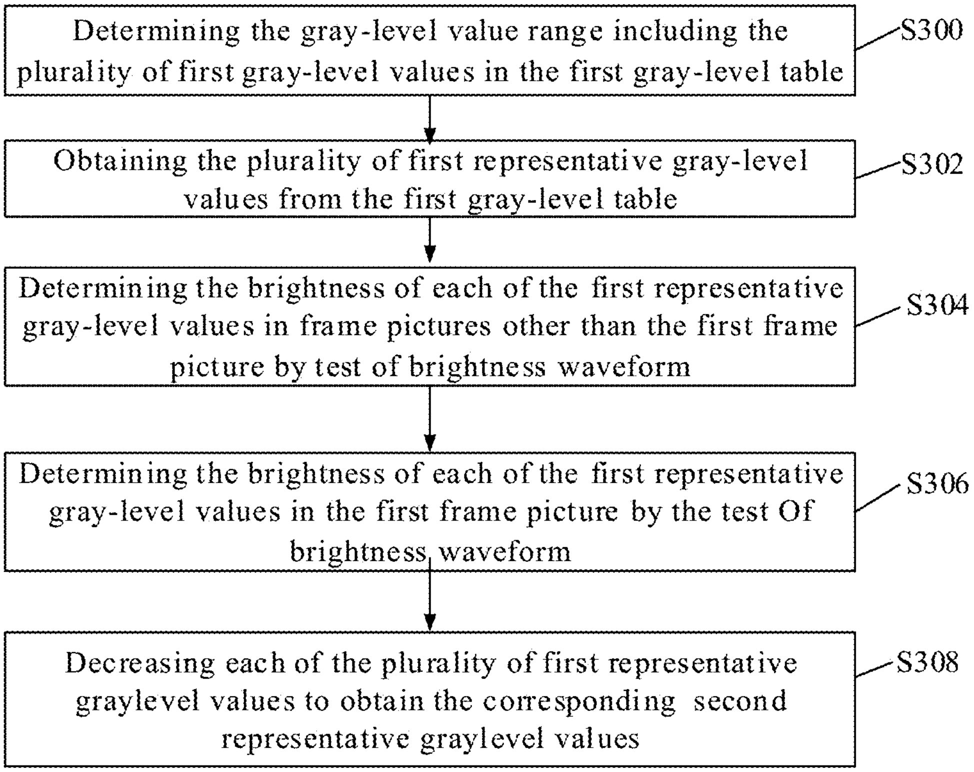
FIG. 6 is a flowchart of a method for obtaining a second gray-level table according to an embodiment of the present disclosure.

FIG. 6 is a flowchart illustrating a method for obtaining a second gray-level table according to an embodiment of the present disclosure, and the method for obtaining a second gray-level table will be described in detail with reference to FIG. 6.

In step S300, a gray-level value range including the plurality of first gray-level values in the first gray-level table is determined. The present disclosure is described by taking the gray-level value range of L0 to L255 as an example, but the present disclosure is not limited thereto.

In step S302, a plurality of first representative gray-level values are acquired from the gray-level value range including the plurality of first gray-level values in the first gray-level table. The plurality of first representative gray-level values are ranked in an order from the minimum to the maximum in the first gray-level table and cover the value range of the plurality of first gray-level values. For example, the plurality of first representative gray-level values may include L32, L63, L127, L191 and L223, and substantially cover the whole gray-level value range of L0 to L255.

In step S304, the brightness of each of the first representative gray-level values in other frame pictures other than the first frame picture is determined by brightness waveform test.

In step S306, the brightness of each of the first representative gray-level values in the first frame picture is determined by the brightness waveform test.

In step S308, the gray-level value of each of the plurality of first representative gray-level values is progressively decreased (descended), such that a difference between the brightness in the first frame picture obtained from each decreased first representative gray-level value and the brightness in the last frame picture obtained from the corresponding first representative gray-level value which is not decreased is minimum, and each decreased first representative gray-level value is taken as a corresponding second representative gray-level value.

Optionally, the minimum brightness difference between the brightness in the first frame picture obtained from each decreased first representative gray-level value and the brightness in the last frame picture obtained from the corresponding first representative gray-level value which is not decreased may be determined by the following: inputting the gray-level voltages of the first representative gray-level values to the plurality of sub-pixels in the last frame picture of a predetermined period, and inputting the gray-level voltages of the same first representative gray-level values to the plurality of sub-pixels in the first frame picture in a subsequent predetermined period after the predetermined period; and then, progressively decreasing the first representative gray-level values input to the plurality of sub-pixels in the first frame picture in the subsequent predetermined period, until a peak between a brightness waveform of the last frame picture in the predetermined period and a brightness waveform of the first frame picture in the subsequent predetermined period after the predetermined period is minimum. The brightness waveform test may be performed by a photo sensor.

For example, the gray-level voltages of the first representative gray-level values of L32, L63, L127, L191, and L223 in the first gray-level table and the gray-level voltages of the decreased first representative gray-level values progressively are applied to a last frame picture and a subsequent first frame picture after the last frame picture, until the peak of the brightness waveform at the interface of gray-level change between the last frame picture and the first frame picture after the last frame picture is minimum. For example, for the first representative gray-level value of L127, the minimum peak of the brightness waveform may occur at a gray-level value of the gray-level value L127 decreased by 4 levels; and for the first representative gray-level value of L63, the minimum peak of the brightness waveform may occur at a gray-level value of the gray-level value L63 decreased by 2 levels.

Optionally, a linear interpolation processing may be performed on the first gray-level values other than the plurality of first representative gray-level values to obtain corresponding second gray-level values. The second representative gray-level values and the second gray-level values may be stored, thereby obtaining the second gray-level table. Specifically, the interpolation processing may be performed on two second representative gray-level values adjacent to each other in value and two corresponding first representative gray-level values, and first gray-level values in the first gray-level table between the two corresponding representative first gray-level values and other than the plurality of first representative gray-level values, to obtain the second gray-level values corresponding to the first gray-level values between the two corresponding first representative gray-level values and other than the plurality of first representative gray-level values, and the second representative gray-level values and the second gray-level values other than the second representative gray-level values are stored in the second gray-level table. Optionally, the interpolation process may be a linear interpolation process, but the present disclosure is not limited thereto.

Figure 7:
FIG. 7 is a schematic diagram illustrating comparison between a test result of a method for driving a liquid crystal display panel according to an embodiment of the present disclosure and a test result in the related art.

FIG. 7 is a schematic diagram illustrating a comparison between a test result of a driving method for a liquid crystal display panel according to an embodiment of the present disclosure and a test result of the related art. As can be seen from FIG. 7, compared with the 3-Frame mode in the related art, the driving method of the present disclosure effectively reduces the instantaneous brightness change at a time point after 28 s, does not cause display abnormality for the pictures at the same time, and eliminates the flicker caused by 28SPOL inversion.

Through the above driving method of the present disclosure, the flicker caused by 28SPOL inversion can be eliminated, and the display quality of the liquid crystal display panel can be enhanced.

According to another aspect of the present disclosure, a non-transitory computer storage medium having computer instructions stored thereon is provided, and when the computer instructions are executed by a processor, the above driving method may be implemented, so as to eliminate the flicker due to 28SPOL inversion, thereby enhancing the display quality of the liquid crystal display panel.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A driving method for a liquid crystal display panel, wherein the liquid crystal display panel comprises a plurality of sub-pixels arranged in an array, and a display time for the liquid crystal display panel is divided into a plurality of predetermined periods with an equal time length to display a plurality of odd-numbered frame pictures and a plurality of even-numbered frame pictures;

in each of the plurality of predetermined periods, the plurality of odd-numbered frame pictures and the plurality of even-numbered frame pictures are sequentially switched, and driving voltages for each of the plurality of sub-pixels is switched between a positive polarity and a negative polarity when the plurality of odd-numbered frame pictures and the plurality of even-numbered frame pictures are sequentially switched; and a polarity of a driving voltage for each of the plurality of sub-pixels in a last frame picture in one of the plurality of predetermined periods is the same as a polarity in a first frame picture in a subsequent predetermined period after the one of the plurality of predetermined periods, the driving method further comprises: for the plurality of sub-pixels, adopting a first gray-level table for displaying other frame pictures other than a first frame picture in each of the plurality of predetermined periods, the first gray-level table comprising a plurality of first gray-level values; and adopting a second gray-level table for displaying the first frame picture in each of the plurality of predetermined periods, the second gray-level table comprising a plurality of second gray-level values, such that a difference of each of the plurality of sub-pixels, between brightness of the sub-pixel obtained by a second gray-level value in the second gray-level table when the first frame picture is displayed and brightness of the sub-pixel obtained by a corresponding first gray-level value in the first gray-level table when the other frame pictures are displayed, is minimum under a same charging duration, the second gray-level value being smaller than the corresponding first gray-level value.

2. The driving method according to claim 1, wherein a duration of each of the odd-numbered frame picture and the even-numbered frame picture comprises a gray-level voltage input stage and a picture holding stage, and the driving method further comprises switching the first gray-level table to the second gray-level table in the picture holding stage of the last frame picture in the predetermined period.

3. The driving method according to claim 2, wherein the driving method further comprises switching the second gray-level table to the first gray-level table in the picture holding stage of the first frame picture in the predetermined period.

4. The driving method according to claim 3, wherein the switching the first gray-level table to the second gray-level table and the switching the second gray-level table to the first gray-level table comprise:

determining whether it is in a picture holding stage of the first frame picture; and if so, switching the second gray-level table to the first gray-level table; and determining whether it is in a picture holding stage of the last frame picture; and if so, switching the first gray-level table to the second gray-level table.

5. The driving method according to claim 4, wherein the determining whether it is in the picture holding stage of the first frame picture or in the picture holding stage of the last frame picture comprises counting clock signals by a timer, thereby switching the first gray-level table to the second gray-level table or switching the second gray-level table to the first gray-level table.

6. The driving method according to claim 2, wherein the switching the first gray-level table to the second gray-level table and switching the second gray-level table to the first gray-level table comprise:

determining whether it is in a picture holding stage of the first frame picture; and if so, switching the second gray-level table to the first gray-level table; and determining whether it is in a picture holding stage of the last frame picture; and if so, switching the first gray-level table to the second gray-level table.

7. The driving method according to claim 6, wherein the determining whether it is in the picture holding stage of the first frame picture or in the picture holding stage of the last frame picture comprises counting clock signals by a timer, thereby switching the first gray-level table to the second gray-level table or switching the second gray-level table to the first gray-level table.

8. The driving method according to claim 1, wherein switching the first gray-level table to the second gray-level table and switching the second gray-level table to the first gray-level table comprise:

determining whether it is in a picture holding stage of the first frame picture; and if so, switching the second gray-level table to the first gray-level table; and determining whether it is in a picture holding stage of the last frame picture; and if so, switching the first gray-level table to the second gray-level table.

9. The driving method according to claim 8, wherein the determining whether it is in the picture holding stage of the first frame picture or in the picture holding stage of the last frame picture comprises counting clock signals by a timer, thereby switching the first gray-level table to the second gray-level table or switching the second gray-level table to the first gray-level table.

10. The driving method according to claim 9, wherein the switching the first gray-level table to the second gray-level table or the switching the second gray-level table to the first gray-level table comprises:

step S200, counting the clock signals;

step S202, determining whether a counting value of the clock signals reaches a first predetermined value; and if so, determining that it is in the picture holding stage of the last frame picture and proceeding to step S204; and if not, returning to step S200;

step S204, switching the first gray-level table to the second gray-level table, and resetting the counting;

step S206, counting the clock signals;

step S208, determining whether the counting value of the clock signals reaches a second predetermined value; and if so, determining that it is in the picture holding stage of the first frame picture and proceeding to step S210; and if not, returning to step S206; and step S210, switching the second gray-level table to the first gray-level table, and returning to step S200 to continue counting the clock signals.

11. The driving method according to claim 10, further comprising:

obtaining the plurality of second gray-level values in the second gray-level table based on the plurality of first gray-level values in the first gray-level table, wherein the obtaining the plurality of second gray-level values in the second gray-level table comprises:

determining a gray-level value range comprising the plurality of first gray-level values in the first gray-level table;

obtaining a plurality of first representative gray-level values from the gray-level value range comprising the plurality of first gray-level values in the first gray-level table, wherein the plurality of first representative gray-level values are ranked in an order from a minimum to a maximum in the first gray-level table and cover the gray-level value range comprising the plurality of first gray-level values;

determining brightness of each of the first representative gray-level values in the other frame pictures other than the first frame picture by brightness waveform test;

determining brightness of each of the first representative gray-level values in the first frame picture by the brightness waveform test; and progressively decreasing a gray-level value of each of the plurality of first representative gray-level values such that a difference between the brightness in the first frame picture obtained from each decreased first representative gray-level value and the brightness in the last frame picture obtained from the corresponding first representative gray-level value which is not decreased is minimum, wherein each decreased first representative gray-level value is taken as a corresponding second representative gray-level value.

12. The driving method according to claim 1, further comprising:

obtaining the plurality of second gray-level values in the second gray-level table based on the plurality of first gray-level values in the first gray-level table, wherein the obtaining the plurality of second gray-level values in the second gray-level table comprises:

determining a gray-level value range comprising the plurality of first gray-level values in the first gray-level table;

obtaining a plurality of first representative gray-level values from the gray-level value range comprising the plurality of first gray-level values in the first gray-level table, wherein the plurality of first representative gray-level values are ranked in an order from a minimum to a maximum in the first gray-level table and cover the gray-level value range comprising the plurality of first gray-level values;

determining brightness of each of the first representative gray-level values in the other frame pictures other than the first frame picture by brightness waveform test;

determining brightness of each of the first representative gray-level values in the first frame picture by the brightness waveform test; and progressively decreasing a gray-level value of each of the plurality of first representative gray-level values such that a difference between the brightness in the first frame picture obtained from each decreased first representative gray-level value and the brightness in the last frame picture obtained from the corresponding first representative gray-level value which is not decreased is minimum, wherein each decreased first representative gray-level value is taken as a corresponding second representative gray-level value.

13. The driving method according to claim 12, further comprising:

performing an interpolation processing on two second representative gray-level values adjacent to each other in value and two corresponding first representative gray-level values, and first gray-level values in the first gray-level table between the two corresponding representative first gray-level values and other than the plurality of first representative gray-level values, to obtain the second gray-level values corresponding to the first gray-level values between the two corresponding first representative gray-level values and other than the plurality of first representative gray-level values, and storing the second representative gray-level values and the second gray-level values in the second gray-level table.

14. The driving method according to claim 13, wherein the performing an interpolation processing comprising performing a linear interpolation to obtain the second gray-level values corresponding to the first gray-level values between the two adjacent first representative gray-level values and other than the plurality of first representative gray-level values.

15. The driving method according to claim 14, wherein the progressively decreasing a gray-level value of each of the plurality of first representative gray-level values such that a difference between the brightness in the first frame picture obtained from each decreased first representative gray-level value and the brightness in the last frame picture obtained from the corresponding first representative gray-level value which is not decreased is minimum comprises:

inputting the gray-level voltages of the first representative gray-level values to the plurality of sub-pixels in the last frame picture of a predetermined period of the plurality of predetermined periods, and inputting the gray-level voltages of the first representative gray-level values to the plurality of sub-pixels in the first frame picture in a subsequent predetermined period after the predetermined period; and progressively decreasing the first representative gray-level values input to the plurality of sub-pixels in the first frame picture in the subsequent predetermined period, until a difference between a peak of a brightness waveform of the last frame picture in the predetermined period and a peak of a brightness waveform of the first frame picture in the subsequent predetermined period after the predetermined period is minimum.

16. The driving method according to claim 15, wherein the brightness waveform test is performed by a photo sensor.

17. The driving method according to claim 1, further comprising adopting an interlace scanning mode to drive the liquid crystal display panel when displaying alternately odd-numbered frame pictures and even-numbered frame pictures, which comprises:

inputting gray-level voltages corresponding to gray-level values to odd-numbered rows of sub-pixels in one of the odd-numbered frame picture and the even-numbered frame picture adjacent to each other, and obtaining gray-level values of a corresponding even-numbered row of sub-pixels of even-numbered rows of sub-pixels based on gray-level values of two adjacent odd-row numbered rows of sub-pixels in a same column, and inputting gray-level voltages corresponding to the obtained gray-level values of the even-numbered rows of sub-pixels to the corresponding even-numbered row of sub-pixels; and inputting gray-level voltages corresponding to gray-level values to even-numbered rows of sub-pixels in the other of the odd-numbered frame picture and the even-numbered frame picture adjacent to each other, and obtaining gray-level values of a corresponding odd-numbered row of sub-pixels of odd-numbered rows of sub-pixels based on gray-level values of two adjacent even-numbered rows of sub-pixels in a same column, and inputting gray-level voltages corresponding to the obtained gray-level values of odd-numbered rows of sub-pixels to the corresponding odd-numbered row of sub-pixels.

18. The driving method according to claim 17, wherein the gray-level values of the corresponding even-numbered row of sub-pixels each are obtained by calculating an average value of the gray-level values of the two adjacent odd numbered rows of sub-pixels in a same column, and the gray-level values of the corresponding odd-numbered rows of sub-pixels each are obtained by calculating an average value of the gray-level values of the two adjacent even-numbered rows of sub-pixels in a same column.

19. The driving method according to claim 1, wherein the predetermined period is 28 seconds.

20. A non-transitory computer-readable storage medium storing instructions which, when executed by a processor, cause the processor to perform the driving method according to claim 1.

* * * * *